J. J. TOBIN.
COASTER BRAKE.
APPLICATION FILED JULY 14, 1913.

1,157,064.

Patented Oct. 19, 1915.

Witnesses
Arthur W. Carlson
W. T. Smith

Inventor
John J. Tobin
by May W. Zabel Atty.

UNITED STATES PATENT OFFICE.

JOHN J. TOBIN, OF CHICAGO, ILLINOIS, ASSIGNOR TO TOBIN MANUFACTURING COMPANY, OF CHICAGO, ILLINOIS.

COASTER-BRAKE.

1,157,064.

Specification of Letters Patent. Patented Oct. 19, 1915.

Application filed July 14, 1913. Serial No. 778,972.

*To all whom it may concern:*

Be it known that I, JOHN J. TOBIN, a citizen of the United States, residing at Chicago, in the county of Cook and State of Illinois, have invented a certain new and useful Improvement in Coaster-Brakes, of which the following is a full, clear, concise, and exact description, reference being had to the accompanying drawings, forming a part of this specification.

My invention relates to coaster brakes and transmission mechanism for vehicles, and is more particularly adapted for use in connection with bicycles or vehicles of a similar nature.

In one form of my invention, which by the way is the form disclosed herein, I utilize a sprocket driven element for transmitting power to the wheel of a bicycle when said sprocket driven element is rotating in one direction of rotation, and which is so arranged that when said sprocket driven element is rotated backwardly that a braking force is exerted on said wheel. I will explain this form of my invention more particularly in connection with the accompanying drawing in which—

Figure 1:
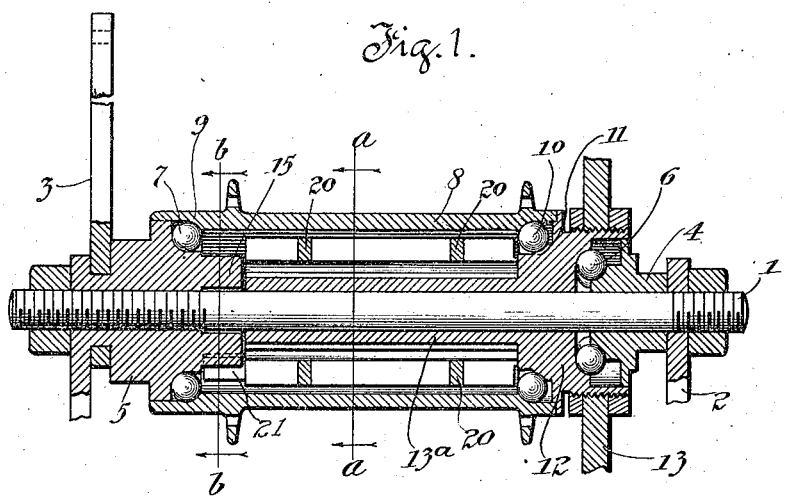
Figure 2:
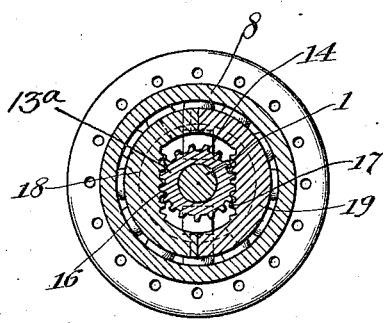
Figure 3:
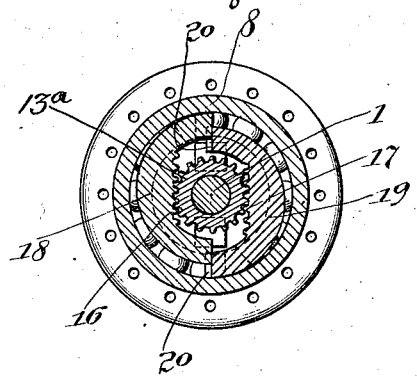
Figure 4:
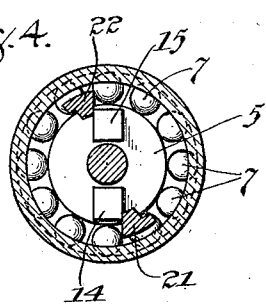
Figure 5:
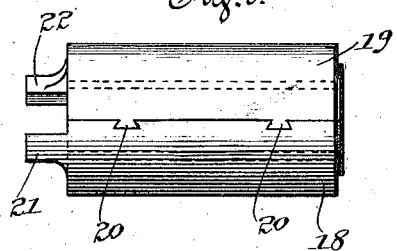

Figure 1 is a longitudinal sectional view of my improved structure; Figs. 2 and 3 are sectional views on line *a—a* of Fig. 1 illustrating the device in alternative positions; Fig. 4 is a sectional view on line *b—b* of Fig. 1, and Fig. 5 is a side view of parts of the device.

Referring more particularly to Fig. 1, I have a shaft 1 stationarily held between frame members 2 and 3 of the machine which in this case might be a bicycle. This shaft also carries bearings 4 and 5 fixedly secured to said shaft to provide seats for the sets of bearing balls respectively 6 and 7. A wheel hub 8 has a bearing section 9 adapted to coöperate with the sets of balls 7 at one extremity thereof and at its other extremity coöperates with a further set 10 of balls which are seated in a bearing section 11 of a rotatable driving element 12. This driving element 12 has fixedly secured thereon a sprocket 13 and is rotatably mounted through its association with the set of balls 6 previously referred to. This driving element 12 has an extending sleeve 13ª which surrounds the shaft 1 and bears thereon, which sleeve 13ª is in the form of a pinion having the teeth 14 as shown more clearly in Figs. 2 and 3. Thus whenever the sprocket wheel 13 is rotated it rotates the driving element 12 and through the interposition of devices presently to be described thereby drives the hub 8 provided the direction of rotation of the sprocket 13 is in the right direction. The bearing portion 5 has lugs 15, 15 as shown more clearly in Figs. 1 and 4, the purpose of which will presently appear. The pinion 13ª engages upon its opposite sides with two racks 16 and 17 respectively forming parts of substantially semi-cylindrical sleeves 18 and 19. These semi-cylindrical sleeves 18 and 19 are dovetailed together as shown more clearly in Figs. 3 and 5 by having the projections 20 fitting corresponding sockets, this to permit sliding motion of these two elements as more clearly apparent from Fig. 3. These semi-cylindrical sleeves 18 and 19 are each provided with lugs 21 and 22 respectively adapted to coöperate with the lugs 15 and 15 as will presently appear.

Now whenever the sprocket wheel is not being driven and the parts are in normal position they occupy the particular positions shown in Figs. 2 and 4 respectively, and also Fig. 1. Now if the sprocket wheel 13 however is driven in a clockwise direction (Fig. 3) then the driving element 12 is rotated in connection with its pinion extension 13ª to displace or separate the elements 18 and 19 so that they occupy the position shown in Fig. 3, whereupon these semi-cylindrical elements 18 and 19 frictionally engage the hub 8 to thereby drive the wheel. In this position of the elements 18 and 19 the lugs 21 and 22 have been moved outwardly from the shaft axis so that they clear the lugs 15 and 15, the lugs 15 and 15 being stationary with the vehicle frame. Now should the sprocket 13 be rotated in a contra-clockwise direction then the elements 18 and 19 are slid over one another during this movement, passing through their central position of Fig. 2 into the position in which the opposite sides of these semi-cylindrical elements engage the interior surface of the hub 8. In this position of course the lugs 21 and 22 are carried inwardly farther even than shown in Fig. 4, thereby preventing further backward rotation of the sprocket 13 and driving element 12 after the semi-cylindrical elements 18 and 19 have engaged the interior annular surface of the hub 8. In this position, the elements 18 and 19 being prevented from rotation and engaging the hub 8, serve to exert a braking force on the hub 8 and consequently the wheel, which is proportional to the backward pressure exerted upon the sprocket 13.

It is of course obvious that in place of the wheel hub any other element acting in a similar way and fixedly secured to the wheel would be the equivalent in its uses to the use of the hub of the wheel as part of my structure herein, and in the claims in using the words wheel hub it is to be construed of course as including such equivalent structure.

From what has been described it is thought the nature of my invention will be clear and it will also be clear that the invention is susceptible of many modifications without departing from its spirit.

Having however thus described one form which my invention may take, what I claim as new and desire to secure by Letters Patent is:

1. In a device of the character described the combination with a wheel hub, of a driving element, radially shifting means driven by said driving element interposed between said element and said hub to drive or brake said hub adapted to engage opposing portions of the inner periphery of said hub depending upon the direction of force exerted by said driving element, and stationarily mounted means adapted to coöperate with said radially shifting means when in one of its alternative positions.

2. In a device of the character described, the combination with a wheel hub, of a driving element, means driven thereby to engage opposing portions of the interior periphery of said hub depending upon the direction of force exerted by said driving element to thereby drive or brake said hub, and means coöperating with said first aforesaid means for braking purposes when in one of its alternative positions.

3. In a device of the character described the combination with a wheel hub, of a driving element, shifting means including a pair of relatively oppositely movable sections shiftable transversely of said hub interposed between said element and said hub adapted to occupy alternative hub engaging positions depending upon the direction of force exerted by said driving element, and stationarily mounted means adapted to coöperate with said sections when in one of their alternative positions.

4. In a device of the character described the combination with a wheel hub, of a driving element, shifting means including a pair of relatively oppositely movable sections interposed between said element and said hub adapted to occupy alternative positions depending upon the direction of force exerted by said driving element, and stationarily mounted means adapted to coöperate with said first aforesaid means when in one of its alternative positions, said driving element including a pinion and said sections being provided with racks meshing with said pinion.

5. In a device of the character described the combination with a wheel hub, of a driving element, shifting means including a pair of relatively oppositely movable sections interposed between said element and said hub adapted to occupy alternative positions depending upon the direction of force exerted by said driving element, and stationarily mounted means adapted to coöperate with said sections when in one of their alternative positions, said driving element including the pinion, and said sections being provided with racks meshing with said pinion.

6. In a device of the character described the combination with a wheel hub, of a driving element, shifting means including a pair of relatively oppositely movable sections interposed between said elements and said hub adapted to occupy alternative positions depending upon the direction of force exerted by said driving element, and stationarily mounted means adapted to coöperate with said first aforesaid means when in one of its alternative positions, said driving element including a pinion and said sections being provided with racks meshing with said pinion, and said sections having means to permit them to slide over each other but to prevent separation in a line at right angles to their relative movement.

7. In a device of the character described the combination with a wheel hub, of a driving element, shifting means including a pair of relatively oppositely movable sections interposed between said element and said hub adapted to occupy alternative positions depending upon the direction of force exerted by said driving element, and stationarily mounted means adapted to coöperate with said sections when in one of their alternative positions, said driving element including a pinion and said sections being provided with racks meshing with said pinion, and said sections having means to permit them to slide over each other but to prevent separation in a line at right angles to their relative movement.

8. In a device of the character described the combination with a wheel hub, of a driving element, and means including a pair of relatively oppositely movable sections shiftable transversely of said hub adapted to occupy alternative positions depending upon the direction of force exerted by said driving element, said means being interposed between said element and said hub to alternatively drive or brake said hub.

9. In a device of the character described the combination with a wheel hub, of a driving element, and means shiftable transversely of said hub adapted to occupy alternative positions depending upon the direction of force exerted by said driving element, said means being interposed between said element and said hub to alternatively drive or brake said hub, said element including a pinion and said sections being each provided with a rack meshing with said pinion.

10. In a device of the character described the combination with a wheel hub, of a driving element, and means including a pair of relatively oppositely movable sections shiftable transversely of said hub adapted to occupy alternative positions depending upon the direction of force exerted by said driving element, said means being interposed between said element and said hub to alternatively drive or brake said hub, said element including a pinion and said sections being each provided with a rack meshing with said pinion.

11. In a device of the character described the combination with a wheel hub, of a driving element, and means shiftable transversely of said hub adapted to occupy alternative positions depending upon the direction of force exerted by said driving element, said means being interposed between said element and said hub to alternatively drive or brake said hub, said element including a pinion and said sections being each provided with a rack meshing with said pinion, and said sections having means to permit them to slide over each other but to prevent separation in a line at right angles to their relative movement.

12. In a device of the character described the combination with a wheel hub, of a driving element, and means including a pair of relatively oppositely movable sections shiftable transversely of said hub adapted to occupy alternative positions depending upon the direction of force exerted by said driving element, said means being interposed between said element and said hub to alternatively drive or brake said hub, said element including a pinion and said sections being provided each with a rack meshing with said pinion, and said sections having means to permit them to slide over each other but to prevent separation in a line at right angles to their relative movement.

13. In a device of the character described the combination with a wheel hub, of a driving pinion, means including a rack coöperating with said pinion and driven thereby to engage different portions of the interior periphery of said hub depending upon the direction of force exerted by said pinion to thereby drive or brake said hub, and means coöperating for braking purposes with said first aforesaid means when in one of its alternative positions.

14. In a device of the character described the combination with a wheel hub having a cylindrical bearing surface, of a propelling element, means to shift said propelling element radially to engage said bearing surface when said propelling element is moved in a given direction to thereby drive said hub, and means coöperating with said propelling element when said propelling element is moved radially in the opposite direction to engage the same bearing surface to thereby brake said hub.

In witness whereof, I hereunto subscribe my name this 8th day of July, A. D. 1913.

JOHN J. TOBIN.

Witnesses:
HAZEL ANN JONES,
A. A. RADTKE.